(12) United States Patent
Song et al.

(10) Patent No.: US 9,902,867 B2
(45) Date of Patent: *Feb. 27, 2018

(54) UNDERCOAT LAYER WITH LOW RELEASE FORCE FOR AQUEOUS PRINTING TRANSFIX SYSTEM

(71) Applicant: XEROX CORPORATION, Norwalk, CT (US)

(72) Inventors: Guiqin Song, Milton (CA); Suxia Yang, Mississauga (CA); Gordon Sisler, St. Catharines (CA); Edward G. Zwartz, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,281

(22) Filed: Jun. 13, 2016

(65) Prior Publication Data

US 2016/0289482 A1 Oct. 6, 2016

Related U.S. Application Data

(63) Continuation of application No. 14/504,707, filed on Oct. 2, 2014, now Pat. No. 9,428,664.

(51) Int. Cl.

| | |
|---|---|
| *C09D 103/00* | (2006.01) |
| *B41N 10/02* | (2006.01) |
| *C09D 129/04* | (2006.01) |
| *B41N 10/04* | (2006.01) |
| *B41J 2/005* | (2006.01) |
| *C08K 5/5419* | (2006.01) |
| *C08K 5/053* | (2006.01) |
| *C08K 5/41* | (2006.01) |
| *B32B 27/18* | (2006.01) |
| *C09D 5/00* | (2006.01) |
| *C09D 5/20* | (2006.01) |
| *C09D 7/12* | (2006.01) |
| *C09D 103/02* | (2006.01) |
| *C09D 101/12* | (2006.01) |
| *C09D 101/28* | (2006.01) |
| *B32B 23/04* | (2006.01) |
| *B32B 25/20* | (2006.01) |
| *B32B 27/30* | (2006.01) |
| *B32B 27/28* | (2006.01) |
| *B41M 5/025* | (2006.01) |

(52) U.S. Cl.
CPC ............ *C09D 103/00* (2013.01); *B32B 27/18* (2013.01); *B41J 2/0057* (2013.01); *B41N 10/02* (2013.01); *B41N 10/04* (2013.01); *C08K 5/053* (2013.01); *C08K 5/41* (2013.01); *C08K 5/5419* (2013.01); *C09D 5/008* (2013.01); *C09D 5/20* (2013.01); *C09D 7/125* (2013.01); *C09D 101/12* (2013.01); *C09D 101/284* (2013.01); *C09D 103/02* (2013.01); *C09D 129/04* (2013.01); *B32B 23/046* (2013.01); *B32B 25/20* (2013.01); *B32B 27/285* (2013.01); *B32B 27/306* (2013.01); *B41M 5/0256* (2013.01); *B41N 2210/02* (2013.01); *B41N 2210/04* (2013.01); *B41N 2210/06* (2013.01); *B41N 2210/12* (2013.01); *B41N 2210/14* (2013.01)

(58) Field of Classification Search
None
See application file for complete search history.

(56) References Cited

U.S. PATENT DOCUMENTS

| | | | |
|---|---|---|---|
| 5,061,607 | A | 10/1991 | Walls |
| 9,126,430 | B2 | 9/2015 | Liu |
| 9,273,218 | B2 | 3/2016 | Liu |
| 9,428,664 | B2 * | 8/2016 | Song ................... C09D 129/04 |
| 2009/0123871 | A1 | 5/2009 | Rondon et al. |
| 2010/0098734 | A1 | 4/2010 | Wille, Jr. |
| 2014/0168330 | A1 | 6/2014 | Liu et al. |
| 2014/0370443 | A1 * | 12/2014 | Hotate ..................... B41N 3/08 430/302 |
| 2015/0035039 | A1 | 3/2015 | Liu |
| 2015/0085036 | A1 * | 3/2015 | Liu ....................... B41J 2/2107 347/101 |
| 2015/0085039 | A1 * | 3/2015 | Liu ........................ C09D 11/38 347/102 |
| 2015/0315403 | A1 | 11/2015 | Song et al. |
| 2015/0361288 | A1 | 12/2015 | Song et al. |

FOREIGN PATENT DOCUMENTS

| | | | |
|---|---|---|---|
| WO | WO 2013/084882 A1 * | 6/2013 | |
| WO | WO2013084882 A1 | 6/2013 | |

* cited by examiner

*Primary Examiner* — Marc Zimmer
(74) *Attorney, Agent, or Firm* — MH2 Technology Law Group LLP (57) ABSTRACT

Disclosed herein are sacrificial coating compositions comprising at least one hydrophilic polymer; at least one hygroscopic agent; at least one surfactant; at least one non-reactive silicone release agent; and water. In certain embodiments, the at least one non-reactive silicone release agent is chosen from polyether modified polysiloxane and nonreactive silicone glycol copolymers. In certain embodiments, the at least one non-reactive silicone release agent may be present in an amount ranging from about 0.001% to about 2%, based on the total weight of the composition, such as from about 0.03% to about 0.06%. Also disclosed herein is a blanket material suitable for transfix printing comprising a sacrificial coating composition, as well as an indirect printing process comprising a step of applying a sacrificial coating composition to a blanket material.

5 Claims, 2 Drawing Sheets

UNDERCOAT LAYER WITH LOW RELEASE FORCE FOR AQUEOUS PRINTING TRANSFIX SYSTEM

PRIORITY CLAIM

This application is a continuation application of and claims priority to U.S. patent application Ser. No. 14/504,707, which is entitled "Undercoat Layer with Low Release Force for Aqueous Printing Transfix System." which was filed on Oct. 2, 2014, now allowed.

DESCRIPTION

Technical Field

The present disclosure relates to sacrificial coating compositions for use with indirect printing processes, such as inkjet printers, for example sacrificial coating compositions for use on an intermediate transfer member of an indirect inkjet printer.

BACKGROUND

In aqueous ink indirect printing, an aqueous ink is jetted onto an intermediate imaging surface, which can be in the form of a blanket. The ink may be dried or partially dried on the blanket prior to transfixing the image to a media substrate, such as a sheet of paper. To ensure excellent print quality, it is desirable that the ink drops jetted onto the blanket spread and become well-coalesced prior to drying. Otherwise, the ink images may appear grainy and/or have deletions. Lack of spreading can also cause missing or failed inkjets in the printheads to produce streaks in the ink image. Spreading of aqueous ink may be facilitated by materials having a high surface free energy, and therefore it is desirable to use a blanket having a high surface free energy to enhance ink spreading.

However, in order to facilitate transfer of the ink image from the blanket to the media substrate after the ink is dried or partially dried on the intermediate imaging surface, a blanket having a surface with a relatively low surface free energy is preferred. Rather than providing the desired spreading of ink, low surface energy materials tend to promote "beading" of individual ink drops on the image receiving surface.

Thus, an optimum blanket for an indirect image transfer process should tackle all of the challenges of wet image quality, including desired spreading and coalescing of the wet ink, and the image transfer of the dried or partially dried ink. The first challenge—wet image quality—prefers a high surface energy blanket that causes the aqueous ink to spread and wet the surface. The second challenge—image transfer—prefers a low surface energy blanket so that the ink, once dried, has minimal attraction to the blanket surface and can be transferred to the media substrate. Those two conflicting requirements can make the whole process of wetting, release, and transfer in indirect printing processes very challenging.

In addition to indirect ink jet printing, offset lithography is a common method of printing today and, having similar challenges, is contemplated for the processes and compositions disclosed herein. In a typical lithographic process, a printing plate, which may be a flat plate, the surface of a cylinder, or belt, etc., is formed to have "image regions" formed of hydrophobic and oleophilic material, and "non-image regions" formed of a hydrophilic material. The image regions are regions corresponding to the areas on the final print (i.e., the target substrate) that are occupied by a printing or marking material such as ink, whereas the non-image regions are the regions corresponding to the areas on the final print that are not occupied by said marking material. The hydrophilic regions accept and are readily wetted by a water-based fluid, commonly referred to as a fountain solution (for example comprising water and a small amount of alcohol as well as other additives and/or surfactants to reduce surface tension). The hydrophobic regions repel fountain solution and accept ink, whereas the fountain solution formed over the hydrophilic regions forms a fluid "release layer" for rejecting ink. Therefore the hydrophilic regions of the printing plate correspond to unprinted areas, or "non-image areas", of the final print.

The ink may be transferred directly to a substrate, such as paper, or may be applied to an intermediate surface, such as an offset (or blanket) cylinder in an offset printing system. The offset cylinder may be covered with a conformable coating or sleeve with a surface that can conform to the texture of the substrate, which may have surface peak-to-valley depth somewhat greater than the surface peak-to-valley depth of the imaging plate. Also, the surface roughness of the offset blanket cylinder helps to deliver a more uniform layer of printing material to the substrate free of defects such as mottle. Sufficient pressure is used to transfer the image from the offset cylinder to the substrate. Pinching the substrate between the offset cylinder and an impression cylinder may provide this pressure.

In one variation, referred to as dry or waterless lithography or driography, the plate cylinder is coated with a silicone rubber that is hydrophobic and physically patterned to form the negative of the printed image. A printing material is applied directly to the plate cylinder, without first applying any fountain solution as in the case of the conventional or "wet" lithography process described earlier. The printing material includes ink that may or may not have some volatile solvent additives. The ink is preferentially deposited on the imaging regions to form a latent image. If solvent additives are used in the ink formulation, they may preferentially diffuse towards the surface of the silicone rubber, thus forming a release layer that may reject the printing material. The low surface energy of the silicone rubber adds to the rejection of the printing material. The latent image may again be transferred to a substrate, or to an offset cylinder and thereafter to a substrate, as described above.

The above-described inkjet and lithographic printing techniques may have certain disadvantages. For example, one disadvantage encountered in attempting to modify conventional lithographic systems for variable printing is a relatively low transfer efficiency of the inks off of the imaging plate or belt. For example, in some instances, about half of the ink that is applied to the "reimageable" surface actually transfers to the image receiving media substrate requiring that the other half of the ink be cleaned off the surface of the plate or belt and removed. This relatively low efficiency compounds the cleaning problem in that a significant amount of cleaning may be required to completely wipe the surface of the plate or belt clean of ink so as to avoid ghosting of one image onto another in variable data printing using a modification of conventional lithographic techniques.

Also, unless the ink can be recycled without contamination, the effective cost of the ink is doubled. Traditionally, however, it is very difficult to recycle the highly viscous ink, thereby increasing the effective cost of printing and adding costs associated with ink disposal. Proposed systems fall short in providing sufficiently high transfer ratios to reduce ink waste and the associated costs. A balance must therefore be struck in the composition of the ink to provide optimum spreading on a plate or belt surface including adequate separation between printing and non-printing areas and an increased ability to transfer to a substrate.

Various approaches have been investigated to provide potential solutions to balance the above-mentioned challenges. Those approaches include, for example, blanket material selection, ink design, and auxiliary fluid methods. With respect to blanket material selection, materials that are known to provide optimum release properties include the classes of silicone, fluorosilicone, a fluoropolymer, such as Teflon®, Viton®, and certain hybrid materials. Those materials may have a relatively low surface energy, but may provide poor wetting. Alternatively, polyurethane and polyimide have been used to improve wetting, but at the cost of ink release properties. Tuning ink compositions to address these challenges has proven to be very difficult since the primary performance attribute of the ink is the performance in the print head. For instance, if the ink surface tension is too high it may not jet properly. If, however, the ink surface tension is too low, it will drool out of the face plate of the print head.

One solution that has been proposed is applying a sacrificial wetting enhancement coating, such as a sacrificial coating composition comprising polyvinyl alcohol or starch, onto the blanket. The sacrificial coating composition may be applied to the intermediate transfer member (blanket), where it dries to form a solid film. The coating can have a higher surface energy and/or be more hydrophilic than the base intermediate transfer member. Droplets of ink may be ejected in an imagewise pattern onto the sacrificial coating composition, and then the ink may be at least partially dried to form an ink pattern on the blanket. Finally, the ink pattern and the sacrificial coating composition may be transferred from the blanket to a substrate, such as paper.

Both polyvinyl alcohol and starches, however, are known adhesives. Accordingly, sacrificial coating compositions comprising polyvinyl alcohols and/or starches may have a high release force when coated onto a blanket. This high release force may result in paper jams and/or stripping of the ink during the printing process, as the polyvinyl alcohol or starch based sacrificial coating composition adheres to the blanket.

In order to implement a polyvinyl alcohol or starch based sacrificial coating composition that does not undesirably adhere to the blanket, it is desirable to lower the high release force observed in such sacrificial coating compositions while still maintaining their beneficial properties, such as good wet image quality, for use in indirect printing processes.

SUMMARY

Disclosed herein are sacrificial coating compositions comprising at least one hydrophilic polymer; at least one surfactant; at least one hygroscopic agent; at least one non-reactive silicone release agent; and water.

In certain embodiments, the at least one non-reactive silicone release agent may be present in an amount ranging from about 0.001% to about 2% by weight, relative to the weight of the total composition, such as about 0.01% to about 1%, about 0.05% to about 0.5%, or about 0.1 to about 0.3%. In certain embodiments, the at least one non-reactive silicone release agent may be chosen from polyether modified polysiloxane and nonreactive silicone glycol copolymers. In certain exemplary embodiments, the at least one non-reactive silicone release agent may comprise at least about 80% dimethyl, methyl (polyethylene oxide acetate-capped) siloxane, or, in certain embodiments, the at least one non-reactive silicone release agent may comprise less than about 20% polyethylene glycol monoallyl ether acetate.

Also disclosed herein is a blanket material suitable for transfix printing comprising (1) a first substrate comprising at least one of polysiloxane rubber and fluorinated polymers; and (2) a second substrate on top of the first substrate comprising a sacrificial coating comprising at least one hydrophilic polymer; at least one surfactant; at least one hygroscopic agent; at least one non-reactive silicone release agent; and water.

Further disclosed herein is an indirect printing process comprising the steps of (1) providing an ink composition to an inkjet printing apparatus comprising an intermediate transfer member; (2) applying a sacrificial coating composition onto the intermediate transfer member, wherein the sacrificial coating composition comprises at least one hydrophilic polymer; at least one surfactant; at least one hygroscopic agent; at least one non-reactive silicone release agent; and water; (3) ejecting droplets of ink in an imagewise pattern onto the sacrificial coating composition; (4) at least partially drying the ink to form an ink pattern on the intermediate transfer member; and (5) transferring the ink pattern and the sacrificial coating composition from the intermediate transfer member to a substrate. In certain embodiments the substrate is paper, and in certain embodiments the ink pattern comprises less than about 5% water or solvent, based on the total weight of the dry ink.

Both the foregoing general summary and the following detailed description are exemplary only and are not restrictive of the disclosure.

DETAILED DESCRIPTION

Disclosed herein are sacrificial coating compositions comprising at least one binder selected from the group consisting of (i) hydrophilic polymers, such as polyvinyl alcohol and copolymers of vinyl alcohol and alkene monomers, and (ii) starches; at least one surfactant; at least one hygroscopic agent; at least one non-reactive silicone release agent; and water.

Also disclosed herein are sacrificial coating compositions comprising at least one hydrophilic polymer; at least one surfactant; at least one hygroscopic agent; at least one non-reactive silicone release agent; and water. In certain exemplary embodiments, the at least one hydrophilic polymer may be chosen from polyvinyl alcohol having a degree of hydrolysis of less than about 95%, or polyvinyl alcohol copolymers such as, for example, poly(vinyl alcohol-co-ethylene).

The sacrificial coating compositions disclosed herein may have much lower release force than previously-disclosed sacrificial release compositions. While not wishing to be bound by theory, it is believed that the at least one nonreactive silicone release agent aids in lowering the release force between the sacrificial coating composition and the blanket upon which the sacrificial coating composition is deposited. The sacrificial coating composition, once coated onto a blanket, may dry to form a film demonstrating good wettability on a blanket made from fluorinated polymer, as well as a much lower release force. The release force, also referred to herein as peel force, of the sacrificial coating composition may be measured by any means known in the art. For example, a sample substrate such as paper may be mounted on a Lab Master® Slip and Friction machine and the release force measured at 180 degrees at room temperature.

As used herein, the release force may be defined as the force necessary to separate the sacrificial coating composition, which may be dried or partially dried, from an intermediate transfer member, such as a blanket. The release force may, for example, be measured in g/cm. In certain embodiments, the sacrificial coating compositions disclosed herein may have a release force of less than about 20 g/cm, such as ranging from about 10 g/cm to about 20 g/cm, about 15 g/cm to about 20 g/cm, or about 15 g/cm to about 17 g/cm. In certain exemplary embodiments, the sacrificial coating compositions disclosed herein may have a release force less than about 15 g/cm, such as less than about 12 g/cm, less than about 10 g/cm, or about 10 g/cm. The addition of at least one non-reactive silicone release agent may lower the release force of a sacrificial coating composition as compared to a sacrificial coating composition that does not contain at least one non-reactive silicone release agent. For example, the presence of at least one non-reactive silicone release agent may reduce the release force of the sacrificial coating composition by a factor of at least about 2, such as at least about 3.

As disclosed herein, the at least one non-reactive silicone release agent may be present in the sacrificial coating composition in an amount ranging from about 0.001% to about 2% by weight, relative to the total weight of the composition. For example, the at least one non-reactive silicone release agent may be present in the sacrificial coating composition in an amount ranging from about 0.01% to about 1% from about 0.05% to about 0.5% or from about 0.1 to about 0.3 by weight relative to the total weight of the composition. In one exemplary embodiment, the at least one non-reactive silicone release agent may be present in the sacrificial coating composition in an amount of about 0.045% by weight relative to the total weight of the composition.

As used herein, the term "non-reactive silicone release agent" refers to a silicone-based polymer that generally does not chemically participate in a polymerization reaction or otherwise chemically interact with other ingredients in the sacrificial coating compositions disclosed herein. The at least one non-reactive silicone release agent may comprise multiple organosiloxane or polyorganosiloxane groups per molecule. The term may include, but is not limited to, polymers substantially containing only organosiloxane or only polyorganosiloxane groups in the polymer chain, and polymers where the backbone contains both organosiloxane and polyorganosiloxane groups in the polymeric chain. The at least one non-reactive silicone release agent disclosed herein may also comprise at least one modified side chain and/or at least one modified end group. In certain embodiments, the at least one side chain may be chosen, for example, from polyether, aralkyl, fluoroalkyl, long-chain alkyl, long-chain aralkyl, higher fatty acid ester, higher fatty acid amide, and phenyl modified side chains. In certain embodiments, the non-reactive silicone release agent may have dual modified end groups, for example dual modified end groups chosen from polyether modified end groups and polyether-methoxy modified end groups.

As used herein, the term "non-reactive silicone release agent" may comprise more than 70% polyether-modified polysiloxane or a polyether-modified organopolysiloxane compound such as polyether modified methylalyl polysiloxane copolymer, polyether trisiloxane, polyether-polymethly siloxane copolymer, dimethyl, methyl (polyethylene oxide acetate-capped) siloxane, heptamethyltrisiloxane, silicone glycol copolymer etc.

In certain embodiments disclosed herein, the at least one non-reactive silicone release agent is chosen from polyether modified polysiloxane. In certain embodiments, the at least one non-reactive silicone release agent is chosen from nonreactive silicone glycol copolymers. The at least one non-reactive silicone release agent may comprise at least about 70% dimethyl, methyl (polyethylene oxide acetate-capped) siloxane (such as, for example, CAS number 70914-12-4). In certain exemplary embodiments, the at least one non-reactive silicone release agent comprises less than about 20% polyethylene glycol monoallyl ether acetate (such as, for example, CAS number 27252-87-5).

The at least one binder may be chosen from hydrophilic polymers, such as polyvinyl alcohol and polyvinyl alcohol copolymers, and starches. For example, in certain embodiments, the at least one binder may be chosen from polyvinyl alcohol and polyvinyl alcohol copolymers having a degree of hydrolysis of less than about 95% or may be chosen from poly(vinyl alcohol-co-ethylene). A polyvinyl alcohol based sacrificial coating composition may have a much better wettability on a blanket and more easily form a continuous uniform thin film when dried or partially dried as compared to starch based sacrificial coating compositions. Moreover, a polyvinyl alcohol based sacrificial coating compositions may have improved mechanical properties compared to starch based sacrificial coating compositions. The polyvinyl alcohol based sacrificial coating compositions disclosed herein may control the ink spreading more uniformly and thus result in improved image quality (such as, for example, improved drop uniformity, line sharpness, etc.). Additionally, polyvinyl alcohol based sacrificial coating compositions may have a longer shelf life when compared to starch based sacrificial coating compositions. Both polyvinyl alcohol and starch, however, are considered environmental friendly for use in sacrificial coating compositions.

The at least one hydrophilic polymer can act as a binder in the compositions of the present disclosure. Examples of the at least one hydrophilic polymer include poly(vinylpyrrolidinone) (PVP), copolymers of PVP, poly(ethylene oxide), hydroxyethyl cellulose, cellulose acetate, poly(ethylene glycol), copolymers of poly(ethylene glycol), diblock copolymers of poly(ethylene glycol), triblock copolymers of poly(ethylene glycol), polyvinyl alcohol (PVOH), copolymers of PVOH, polyacrylamide (PAM), poly(N-isopropylacrylamide) (PNIPAM), poly(acrylic acid), polymethacrylate, acrylic polymers, maleic anhydride copolymers, sulfonated polyesters, and mixtures thereof.

The at least one hydrophilic polymer can have suitable weight average molecular weight from 3000 to 300,000. In an embodiment, the at least one hydrophilic polymer can provide a suitable viscosity for forming a sacrificial coating on an intermediate transfer member. For example, at about 5% by weight of the at least one hydrophilic polymer in a solution DI water, at 20° C. the viscosity can range from about 2 cps to about 800 cps, such as about 3 cps to about 500 cps, or about cps to about 100 cps, where the % by weight is relative to the total weight of the at least one hydrophilic polymer and water.

The at least one hydrophilic polymer has excellent wet film-forming and good water retention properties. The at least one hydrophilic polymer can have 100% solubility in water or hydrophilic media. As a hydrophilic polymer, the coating film formed therefrom can exhibit good water retention properties, which can assist the ink spreading on the blanket, and can have uniform film-forming properties, for example, after the liquid coating composition is semi-dried or dried on a substrate. In addition, the shelf life of the at least one hydrophilic polymer-based formulations of embodiments can be relatively long compared to some polymers, such as starches. The mechanical properties of hydrophilic polymers can be significantly better when compared to starches.

Further examples of suitable hydrophilic polymers may include polyvinyl alcohol copolymers, such as poly(vinyl alcohol-co-ethylene). In an embodiment, the poly(vinyl alcohol-co-ethylene) may have an ethylene content ranging from about 5 mol % to about 30 mol %. Other examples of polyvinyl copolymer include poly(acrylic acid)-poly(vinyl alcohol) copolymer, polyvinyl alcohol-acrylic acid-methyl methacrylate copolymer, poly(vinyl alcohol-co-aspartic acid) copolymer, etc.

In certain exemplary embodiments disclosed herein, the degree of hydrolysis of the polyvinyl alcohol may range from about 75% to about 95%. The nominal molecular weight of the polyvinyl alcohol may range from about 8,000 to about 30,000. In certain embodiments, the viscosity of a 4% polyvinyl alcohol solution at about 20° C. ranges from about 3 cps to about 30 cps. In certain exemplary embodiments, the at least one binder may be chosen from polyvinyl alcohol copolymers, such as poly(vinyl alcohol-co-ethylene) having an ethylene content ranging from about 5 to about 30 mole %.

According to certain embodiments, the degree of hydrolysis of the at least one polyvinyl alcohol may range from about 75% to about 95%, such as, for example about 80% to about 90%, or about 85% to about 88%. The nominal molecular weight of the at least one polyvinyl alcohol may range from about 8,000 to about 30,000. The polyvinyl copolymers may be, for example, poly(vinyl alcohol-co-ethylene) with an ethylene content ranging from about 5 to about 30 mole %. The viscosity of a 4% polyvinyl alcohol solution at 20° C. may range from about 3 cps to about 30 cps.

Polyvinyl alcohol may be manufactured by hydrolysis of polyvinyl acetate from partially hydrolyzed (about 87% to about 89%), intermediate hydrolyzed (about 91% to about 95%), fully hydrolyzed (about 98% to about 98.8%), or super hydrolyzed (more than about 99.3%). In certain exemplary embodiments, the polyvinyl alcohol employed in the compositions of the present disclosure has a degree of hydrolysis ranging from about 75% to about 95%, such as about 85% to about 90%, or about 87% to about 89%.

The polyvinyl alcohol or copolymer thereof can have any suitable molecular weight. In an embodiment, the weight average molecular weight ranges from about 8,000 to about 50,000, such as from about 10.000 to about 40,000, or from about 13,000 to about 23,000.

In an embodiment, the polyvinyl alcohol can provide a suitable viscosity for forming a sacrificial coating on an intermediate transfer member. For example, at about 4% by weight polyvinyl alcohol in a solution deionized water, at 20° C. the viscosity can range from about 2 cps to about 30 cps, such as about 3 cps to about 15 cps, or about 3 cps to about 5 cps, where the % by weight is relative to the total weight of polyvinyl alcohol and water.

The mechanical properties of polyvinyl alcohol may, in certain embodiments, be improved when compared with starches. Moreover, polyvinyl alcohol is a hydrophilic polymer and has good water retention properties. As a hydrophilic polymer, the coating film formed from polyvinyl alcohol exhibits excellent water retention properties, and thus assists the ink spreading on a blanket. Because of its superior spreading, the coatings formulated with polyvinyl alcohol may achieve a significant reduction in total solid loading level. This may provide substantial cost savings while providing an improvement of the coating film performance. In addition, the shelf life of polyvinyl alcohol based formulations may be long enough to reach a customer's site, and polyvinyl alcohol is also considered to be environmentally friendly.

As a hydrophilic polymer, polyvinyl alcohol exhibits excellent water retention properties. In certain embodiments, it is envisioned that low viscosity grades of polyvinyl alcohol, such as Sekisui® Celvol 103, 107, 502, 203 and 205 polyvinyl alcohols, may be used, as they may provide optimum coating rheology. Table 1 below lists certain exemplary polyvinyl alcohols that may be used according to certain embodiments of the sacrificial coating compositions disclosed herein.

TABLE 1

| Grade | Hydrolysis (%) | Viscosity (cps) (4% solution @ 20° C.) | pH (4% solution @ 20° C.) |
| --- | --- | --- | --- |
| Celvol 103 | 98-98.8 | 3.5-4.5 | 5.0-7.0 |
| Celvol 107 | 98-98.8 | 5.5-6.6 | 5.0-7.0 |
| Celvol 203 | 87-89 | 3.5-4.5 | 4.5-6.5 |
| Celvol 205 | 87-89 | 5.2-6.2 | 4.5-6.5 |
| Celvol 310 | 98-98.8 | 9.0-11.0 | 5.0-7.0 |
| Celvol 418 | 91-93 | 14.5-19.5 | 4.5-7.0 |
| Celvol 502 | 87-89 | 3.0-3.7 | 4.5-6.5 |
| Celvol 513 | 86-89 | 13-15 | 4.5-6.5 |
| Celvol 523 | 87-89 | 23-27 | 4.5-6.5 |

Other polyvinyl copolymers that may be envisioned include poly(vinyl alcohol-co-ethylene) with an ethylene content ranging from about 1 to about 30 mole %.

The chemical structure of the polyvinyl alcohol containing coating composition can be tailored to fine-tune the wettability and release characteristics of the sacrificial coating from the underlying intermediate transfer member surface. This may be accomplished, for example, by employing one or more hygroscopic materials and/or one or more surfactants in the coating composition.

In certain embodiments, the sacrificial coating compositions disclosed herein may comprise at least one binder chosen from starches; at least one surfactant; at least one hygroscopic material; at least one non-reactive silicone release agent; and water. In certain embodiments, the starch may be chosen from at least one of non-ionic waxy maize corn starches and cationic waxy maize corn starches. The viscosity of the starch at about 25° C. may be less than about 1000 cp at a starch solid concentration of about 4%.

Any suitable hygroscopic agent can be employed. Hygroscopic agents can include substances capable of absorbing water from their surroundings, such as humectants. In an embodiment, the hygroscopic material can be a compound that is also functionalized as a plasticizer. Accordingly, as used herein, the term "hygroscopic plasticizer" refers to a hygroscopic material that has been functionalized and can be characterized as a plasticizer. In certain embodiments, the at least one hygroscopic material may be a hygroscopic plasticizer chosen from glycerol/glycerin, sorbitol, xylitol, maltito, polymeric polyols such as polydextrose, glyceryl triacetate, vinyl alcohol, glycols such as propylene glycol, hexylene glycol, butylene glycol, urea, and alpha-hydroxy acids (AHAs). In certain embodiments disclosed herein, the at least one hygroscopic material may be selected from the group consisting of glycerol, glycerin, sorbitol, glycols such as polyethylene glycol, and mixtures thereof. A single hygroscopic material can be used. Alternatively, multiple hygroscopic materials, such as two, three or more hygroscopic materials, can be used.

Any suitable surfactants can be employed. Examples of suitable surfactants include anionic surfactants, cationic surfactants, non-ionic surfactants and mixtures thereof. The non-ionic surfactants can have an HLB value ranging from about 4 to about 14. A single surfactant can be used. Alternatively, multiple surfactants, such as two, three or more surfactants, can be used. For example, a mixture of a low HLB non-ionic surfactant with a value from about 4 to about 8 and a high HLB non-ionic surfactant with value from about 10 to about 14 demonstrates good wetting performance may be used.

In certain embodiments, the at least one surfactant may be sodium lauryl sulfate (SLS), also known as sodium dodecyl sulfate. As disclosed herein, the at least one surfactant may be chosen from secondary alcohol ethoxylate and branched secondary alcohol ethoxylate. In certain exemplary embodiments, the at least one surfactant may be chosen from Tergitol® 15-s-7 having an HLB value of about 12 and Tergitol® TMN-6 having an HLB value of about 13.

Suitable surfactants may include anionic, non-ionic, and cationic surfactants. In certain embodiments, at least one anionic surfactant may be used, such as sodium lauryl sulfate (SLS), Dextrol OC-40, Strodex tredox PK 90, ammonium lauryl sulfate, potassium lauryl sulfate, sodium myreth sulfate and sodium dioctyl sulfosuccinate. In certain embodiments, at least one non-ionic surfactant may be used, such as Surfynol 104 series, Surfynol 400 series, Dynol 604, Dynol 810, Envirogem® 360, secondaryl alcohol ethoxylate series such as Tergitol® 15-s-7, Tergitol® 15-s-9, TMN-6, TMN-100x, and Tergitol® NP-9, and Triton X-100, etc. In certain embodiments, cationic surfactants may be used, such as Chemguard S-106A, Chemguard S-208M, and Chemguard S-216M. Fluorinated or silicone surfactants can be used in certain embodiments, such as, for example. PolyFox® TMPF-136A, 156A, and 151 N, Chemguard S-761p and S-764p, Silsurf® A008, Siltec C-408, BYK 345, 346, 347, 348, and 349, and polyether siloxane copolymers, such as TEGO Wet-260, 270, and 500, etc. Some amphoteric fluorinated surfactants are also envisioned for use in certain embodiments, such as, for example, alkyl betaine fluorosurfactants and alkyl amine oxide fluorosurfactants, such as Chemguard S-500 and Chemguard S-111. Table 2 below lists exemplary surfactants that may be considered for use in both the sacrificial coating compositions disclosed herein that may be incorporated in the sacrificial coating compositions.

TABLE 2

| Series | Grade | Function | Type | Chemical Name | Active Ingredient (%) | Petroleum Ether Soluble Matter (%) | Alcohol Insoluble Matter (%) | Water Content (%) | pH | Free Sulfonic Acid (%) |
|---|---|---|---|---|---|---|---|---|---|---|
| Tayca-lite | N4133 | Forming cleansing emulsification/dispersion permeation/penetration | Natural alcohol | Sodium higher alcohol sulfate | 33.0 ± 1.0 | 1.0≥ | 2.0≥ | 68.0≥ | 7.5-9.5 | — |
| Tayca-pol | NE1230 | Forming cleansing emulsification/dispersion permeation/penetration | Natural alcohol | Sodium higher alcohol ethoxysulfate | 27.0 ± 1.0 | 1.0≥ | 1.0≥ | 74.0≥ | 6.0-8.0- | — |
|  | NE1270 |  |  |  | 70.0 ± 2.0 | 3.0≥ | 3.0≥ | 32.0≥ | 6.0-8.0- | — |
|  | NE1325 |  |  |  | 25.5 ± 1.5 | 1.0≥ | 1.0≥ | 76.0≥ | 6.0-8.0- | — |
|  | NE1370 |  |  |  | 70.0 ± 2.0 | 2.8≥ | 3.0≥ | 32.0≥ | 6.5-8.8- | — |
|  | NE7030 |  | Synthetic alcohol |  | 27.0 ± 1.0 | 1.0≥ | 1.0≥ | 74.0≥ | 6.0-8.0 | — |
| Tayca-power | B120 B121 BN2060 | Forming cleansing emulsification/dispersion permeation/penetration | Hard (branched alkyl) | Dodecylbenzenesulfonic-acid | 96.0≤ 96.0≤ | 3.0≥ 2.5≥ | — — | — 1.0≥ | — — | 0.8≥ 1.5≥ |
|  |  |  |  | Sodium-dodecylbenzenesulfonate | 60.0 ± 2.0 | 2.0≥ | 1.5≥ | 40.50≥ | 6.0-8.0 | — |

TABLE 2-continued

| Series | Grade | Function | Type | Chemical Name | Active Ingredient (%) | Petroleum Ether Soluble Matter (%) | Alcohol Insoluble Matter (%) | Water Content (%) | pH | Free Sulfonic Acid (%) |
|---|---|---|---|---|---|---|---|---|---|---|
|  | BN2070M | Emulsification/ |  |  | *70.0≤ | — | — | 3.0≥ | 6.0-8.0 | — |
|  | BC2070M | dispersion permeation/penetration Solubilization |  | Calcium-dodecyl-benzene-sulfonate | *70.0≤ | — | — | 3.0≥ | 6.0-8.0 | — |
|  | L120D | Forming cleansing emulsification/dispersion permeation/penetration | Soft (linear alkyl) | Dodecyl-benzene-sulfonate | 96.0≤ | 2.5≥ | — | 1.0≥ | — | 1.5≥ |
|  | L121 |  |  |  | 96.0≤ | 2.5≥ | — | 1.0≥ | — | 1.5≥ |
|  | L124 |  |  |  | 96.0≤ | 2.5≥ | — | 1.0≥ | — | 1.5≥ |
|  | LN205D |  |  | Sodium-dodecyl-benzene-sulfonate | 50.0 ± 2.0 | 1.5≥ | 2.0≥ | 50.0≥ | 6.0-8.0 | — |
|  | LN2450 |  |  |  | 50.0 ± 2.0 | 1.5≥ | 2.0≥ | 50.0≥ | 6.0-8.0 | — |
|  | LN2425 |  |  |  | 25.0 ± 1.0 | 0.8≥ | 1.0≥ | 75.0≥ | 6.0-8.0 | — |

The embodiments disclosed herein have good wettability on a fluorinated polymer substrate, good ink holding, wetting and spreading properties, as well as further improved transfer properties.

In certain embodiments disclosed herein, the sacrificial coating composition may be made by mixing the ingredients comprising at least one hydrophilic polymer; at least one hygroscopic agent; at least one surfactant, at least one non-reactive silicone release agent; and water.

Also disclosed herein is a blanket material suitable for a transfix printing process comprising a first substrate made of a polysiloxane rubber or fluorinated polymer and a sacrificial coating comprising a composition comprising at least one hydrophilic polymer; at least one hygroscopic agent; at least one surfactant, and at least one non-reactive silicone release agent.

Further disclosed herein are processes for coating a blanket with a sacrificial coating composition comprising at least one hydrophilic polymer; at least one hygroscopic agent; at least one surfactant; and at least one non-reactive silicone release agent, such as, for example, transfix print processes using a blanket. In certain embodiments, the preparation of sacrificial coating compositions as disclosed herein comprising at least one non-reactive silicone release agent involves at least two steps of preparing the sacrificial coating composition and coating of the sacrificial coating composition on a blanket, such as a fluorosilicone blanket.

As used herein, a reference to a dried layer or dried coating refers to an arrangement of a hydrophilic compound after all or a substantial portion of the liquid carrier has been removed from the composition through a drying process. As described herein, an indirect inkjet printer forms a layer of a hydrophilic composition on a surface of an intermediate transfer member using a liquid carrier, such as water, to apply a layer of the hydrophilic composition. The liquid carrier is used as a mechanism to convey the hydrophilic composition to an image receiving surface to form a uniform layer of the hydrophilic composition on the image receiving surface.

Initially, the sacrificial coating composition is applied to an intermediate transfer member, where it is dried or semi-dried to form a film. The coating can have a higher surface energy and/or be more hydrophilic than the base intermediate transfer member, which is usually a material with low surface energy, such as, for example, a polysiloxane, such as polydimethylsiloxane or other silicone rubber material, fluorosilicone, Teflon®, polyimide or combinations thereof.

The drying process may increase the viscosity of the aqueous ink, which changes the consistency of the aqueous ink from a low-viscosity liquid to a higher viscosity tacky material. The drying process may also reduce the thickness of the ink. In certain embodiments, the drying process may remove sufficient water so that the ink contains less than about 5% water or other solvent by weight, such as less than about 2% water, or even less than about 1% water or other solvent, by weight of the ink.

In certain embodiments disclosed herein, the sacrificial coating composition may be made by mixing the ingredients comprising at least one hydrophilic polymer; at least one hygroscopic agent; at least one non-reactive silicone release agent and at least one surfactant.

The ingredients of the sacrificial coating can be mixed in any suitable manner to form a composition that can be coated onto the intermediate transfer member. In addition to the ingredients discussed above, the mixture can include other ingredients, such as solvents and biocides. Example biocides may include Acticides® CT, Acticides® LA 1209, and Acticides® MBS in any suitable concentration, such as from about 0.1 weight percent to about 2 weight percent. Examples of suitable solvents may include water, isopropanol, MEK (methyl ethyl ketone), and mixtures thereof.

The ingredients can be mixed in any suitable amounts. For example, the at least one hydrophilic polymer can be added in an amount ranging from about 0.5% to about 30%, or from about 1% to about 10%, or from about 1.5% to about 5%, by weight based upon the total weight of the coating mixture. The at least one surfactant can be present in an amount ranging from about 0.1% to about 4%, or from about 0.3% to about 2%, or from about 0.2% to about 0.5%, by weight based upon the total weight of the coating mixture.

The at least one hygroscopic agent can be present in an amount ranging from about 0.5% to about 30%, or from about 5% to about 20%, or from about 10% to about 15%, by weight based upon the total weight of the coating mixture. The at least one non-reactive silicone release agent can be present in an amount ranging from about 0.01% to about 1%, or from about 0.05% to about 0.5%, or from about 0.1% to 0.3%.

The compositions of the present disclosure can be used to form a sacrificial coating over any suitable substrate. Any suitable coating method can be employed, including, but not limited to, dip coating, spray coating, spin coating, flow coating, stamp printing, die extrusion coatings, flexo and gravure coating, and/or blade techniques. In exemplary embodiments, suitable methods can be employed to coat the liquid sacrificial coating composition on an intermediate transfer member, such as, for example, use of an anilox roller; or an air atomization device, such as an air brush or an automated air/liquid sprayer can be used for spray coating. In another example, a programmable dispenser can be used to apply the coating material to conduct a flow coating.

In certain embodiments disclosed herein, the sacrificial coating composition can first be applied or disposed as a wet coating on the intermediate transfer member. In certain embodiments, the wet coating can be heated at an appropriate temperature for the drying and curing, depending on the material or process used. For example, the wet coating can be heated to a temperature ranging from about 30° C. to about 200° C. for about 0.01 seconds to about 100 seconds, such as from about 0.1 second to about 60 seconds.

In certain exemplary embodiments, after the drying and curing process, the sacrificial coating can have a thickness ranging from about 0.01 micrometer to about 10 micrometers, such as from about 0.02 micrometer to about 5 micrometers, or from about 0.05 micrometer to about 1 micrometers.

In an embodiment, the sacrificial coating can cover a portion of a major surface of the intermediate transfer member. The major outer surface of the intermediate transfer member can comprise, for example, polysiloxanes, fluorosilicones, fluoropolymers such as Viton®, Teflon®, and the like.

As disclosed herein, there are certain advantages that may be achieved by embodiments disclosed herein over processes known in the art. For example, sacrificial coating compositions comprising at least one non-reactive silicone release agent as disclosed herein may improve the performance of the sacrificial layer in transfuse printing processes by, for example, lowering the release force. Moreover, the ability to improve performance may result in lowering process costs. According to certain transfer processes disclosed herein, the sacrificial coating compositions may reduce the potential for paper jams during the printing process and may also allow for improved printing efficiencies, such as by reducing the necessity for cleaning the intermediate transfer member. The sacrificial coating compositions disclosed herein may also allow for independent control of rheological properties at the transfer temperature, as well as a higher solid loading of the sacrificial composition layer with a minimum increase in the viscosity.

Unless otherwise indicated, all numbers used in the specification and claims are to be understood as being modified in all instances by the term "about," whether or not so stated. It should also be understood that the precise numerical values used in the specification and claims form additional embodiments of the disclosure, as do all ranges and subranges within any specified endpoints. Efforts have been made to ensure the accuracy of the numerical values disclosed in the Examples. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary.

It is to be understood that both the foregoing description and the following example are exemplary and explanatory only and are not intended to be restrictive. In addition, it will be noted that where steps are disclosed, the steps need not be performed in that order unless explicitly stated.

The accompanying figures, which are incorporated in and constitute a part of this specification, are not intended to be restrictive, but rather illustrate embodiments of the disclosure.

Other embodiments will be apparent to those skilled in the art from consideration of the specification and practice of the disclosure.

EXAMPLE

The following example is not intended to be limiting of the disclosure.

Example 1

Example 1A—Polyvinyl Alcohol Solution Preparation

Solutions of about 5% to about 30% solid content polyvinyl alcohol (PVOH) were prepared using deionized water. The PVOH powder was added into cold water while stirring to avoid the formation of lumps. Once the powder was fully dispersed, the mixture was heated to the temperature at which the polymer became solubilized (ranging from about 85° C. to about 98° C., depending on the grade of PVOH used). Mixing was continued at this temperature until the PVOH was fully solubilized. Depending on the grade of material and efficiency of the agitation system, full solubilization may take some time to achieve.

Example 1B—Polyvinyl Alcohol Based Undercoat Composition

Two sacrificial coating compositions were prepared. Sample A was made as a control composition without any silicone release agents loaded in the composition, and Sample B contained about 0.045% Dow Corning® 57 additive, a liquid silicone release agent comprising nonreactive silicone glycol copolymer. The control Sample A sacrificial coating was prepared by mixing a solution comprising 4.5% PVOH 203, 15% glycerol, 0.3% SLS and 80.2% deionized water. The experimental Sample B sacrificial coating was prepared by mixing a solution comprising 4.5% PVOH 203, 15% glycerol, 0.3% SLS, 0.045% Dow Corning® 57 additive, and 80.155% deionized water.

Example 1C—Starch-Based Sacrificial Coating Composition

Starch gelatinization is a process that breaks down the intermolecular bonds of starch molecules in the presence of water and heat, allowing the hydrogen bonding sites (the hydroxyl hydrogen and oxygen) to engage more water. This irreversibly dissolves the starch granule.

Solutions of about 5% to about 35% solid content starch were prepared with deionized water. The solutions were then heated up to about 93° C. to about 98° C. and kept at this temperature for about 15 to about 20 minutes.

Two starch-based sacrificial coating compositions were prepared. Sample C was made as a control composition without any silicone release agents loaded in the composition, and Sample D contained about 0.045% Dow Corning® 57 additive. The control Sample C sacrificial coating was prepared by mixing a solution comprising 4.5% Cargill Caliber 180 starch, 15% glycerol, 0.3% SLS, and 80.2% deionized water. The experimental Sample D sacrificial coating was prepared by mixing a solution comprising 4.5% Cargill Caliber 180 starch, 15% glycerol, 0.3% SLS, 0.045% Dow Corning 57 additive, and 80.155% deionized water.

Example 1D—Coating Process

The substrate blanket was made from a fluorinated polymer FKM elastomer Daikin G621 with amino silane AO700 as a crosslinker. It was first rinsed with running hot water and then wiped with IPA. The blanket was then put on the hotplate, which was set at 50° C. After the surface temperature of the blanket reached about 50° C., the sacrificial coating composition solution was manually coated on this blanket using an anilox roll (165013). The blanket was left on the hotplate for about one minute to dry the coated skin film. The process was repeated for all of Sample A, Sample B, Sample C, and Sample D.

Example 1E—Optical Microscope Images

In order to have good wetting and spreading of ink on the sacrificial coating compositions, it may be desirable to make sure that the skin film is continuous and uniform, which can be observed from the rainbow effect. Optical microscope (OM) images were taken on the film, which was coated on G621 blanket substrates. The OM images for the controls (Samples A and C) and the formulations with the Dow Corning® 57 additive release agent (Samples B and D) all showed excellent film uniformity.

Example 1F—Release Force Measurement

To measure the release force of the formulations, a 1.5" wide strip of Xerox® Digital Color Elite Gloss (DCEG) paper was pressed on top of the dried film as described above in the coating process. Another anilox roll was used and gently pressed on the paper five times back and forth. Then the sample paper was mounted on a Lab Master® Slip and Friction machine. The release force was measured at 180 degrees using the "Demo" mode at room temperature. Three replicates were run on each sample.

Example 1G—Results of Release Force Measurement

Figure 1:
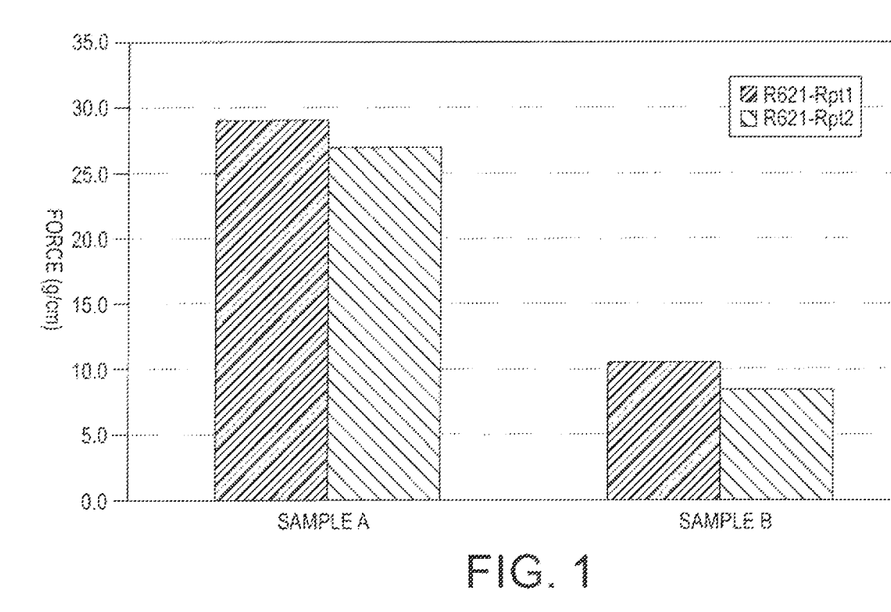
FIG. 1 is a bar graph comparing the release force as measured on two blankets coated with Sample A and two blankets coated with Sample B, as described in Example 1 herein.
Figure 2:
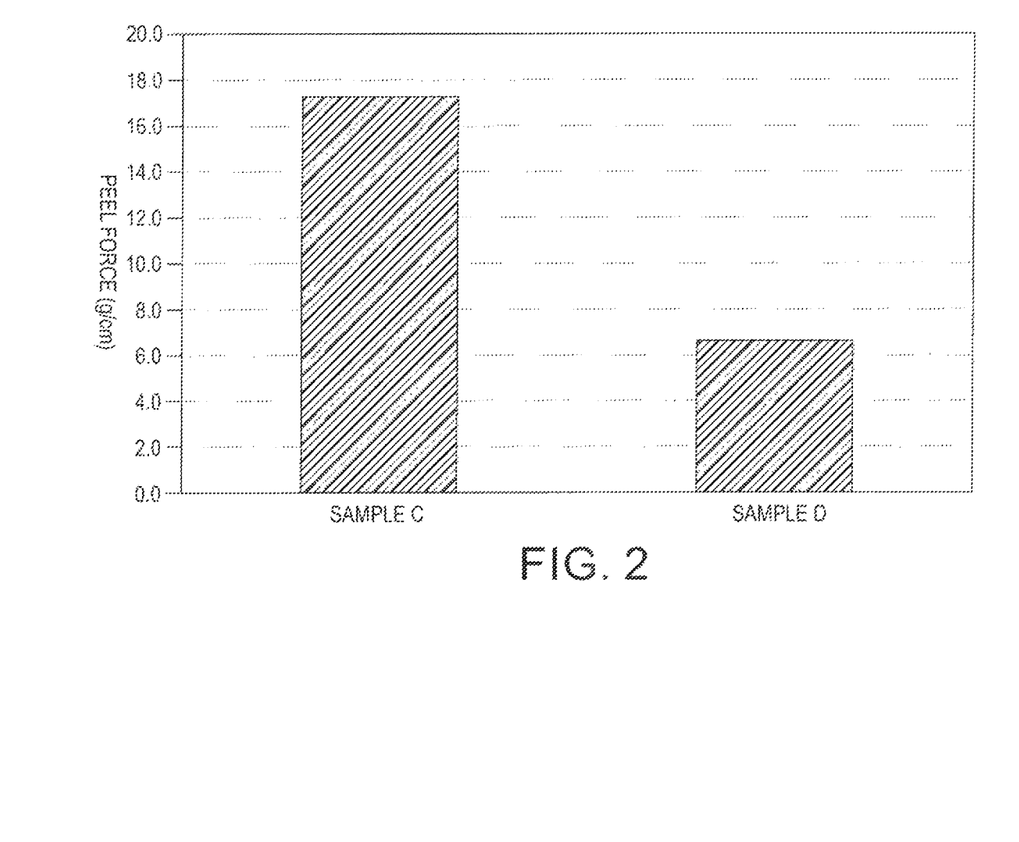
FIG. 2 is a bar graph comparing the release force as measured on a blanket coated with Sample C versus a blanket coated with Sample D, as described in Example 1 herein.

By adding release agents such as Dow Corning® 57 additive, the release force showed about a 3 times reduction compared to the control that had no lubricant, as shown in FIG. 1 and FIG. 2.

FIG. 1 is a bar graph showing release forces measured on two G621 blankets (Repeat1 and Repeat2) for PVOH based sacrificial coating compositions (control Sample A vs. experimental Sample B).

FIG. 2 is a bar graph showing release forces measured on a G621 blanket for a Cargill Caliber 180 starch based formulation (control Sample C and experimental Sample D).

Sample C with Cargill Caliber 180 starch as binder and with no added silicone release agent had a peel force ranging from about 15 g/cm to about 17 g/cm. Sample A, the PVOH based formulation with no added silicone release agent, had a peel force ranging from about 28 g/cm to about 30 g/cm. The high peel force of Sample A results in a composition that may not properly release from the blanket and may cause paper jams during printing processes. As shown in Sample B, the Dow Corning® 57 additive lowered the peel force of a PVOH based formulation from about 28 g/cm to about 30 g/cm to a peel force of about 10 g/cm, which is much lower than the starch-based composition prepared as Sample C, having a peel force ranging from about 15 to about 17 g/cm. Moreover, as shown in Sample D, the Dow Corning® 57 additive lowered the peel force of a starch based formulation from about 15 g/cm to about 17 g/cm to a peel force of less than about 7 g/cm.

What is claimed is:

1. A coating composition comprising:
   at least one hydrophilic polymer;
   at least one surfactant;
   at least one hygroscopic agent;
   at least one non-reactive silicone release agent; and
   water, wherein the at least one hydrophilic polymer is a starch and the at least one non-reactive silicone is a polyether modified polysiloxane;
   wherein the at least one non-reactive silicone release agent is present in an amount ranging from about 0.001% to less than about 0.1% by weight relative to the total composition weight.

2. The coating composition according to claim 1, wherein the at least one non-reactive silicone release agent comprises dimethyl, methyl (polyethylene oxide acetate-capped) siloxane, present in an amount of at least about 70% of the total amount of the release agent.

3. The coating composition according to claim 1, wherein the at least one hydrophilic polymer is selected from a non-ionic waxy maize starch and a cationic waxy maize starch.

4. The coating composition according to claim 1, wherein a viscosity of the at least one hydrophilic polymer in a DI water solution at 20° C. ranges from about 3 cps to about 800 cps, wherein the solution contains about 5% by weight hydrophilic polymer relative to a total weight of the at least one hydrophilic polymer and DI water in the solution.

5. The coating composition according to claim 1, wherein the at least one hygroscopic agent is chosen from glycerin, sorbitol, vinyl alcohols, glycols, xylitol, maltitol, polymeric polyols, glyceryl triacetate, glycouril, Ionic liquids and mixtures thereof.

* * * * *